US011079056B2

(12) United States Patent
Allison

(10) Patent No.: US 11,079,056 B2
(45) Date of Patent: Aug. 3, 2021

(54) CERAMIC-BACKED ELBOW AND COATING SYSTEM AND METHOD

(71) Applicant: Progressive Products, Inc., Pittsburg, KS (US)

(72) Inventor: Todd N. Allison, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 575 days.

(21) Appl. No.: 15/877,009

(22) Filed: Jan. 22, 2018

(65) Prior Publication Data

US 2018/0142826 A1 May 24, 2018

Related U.S. Application Data

(63) Continuation-in-part of application No. 14/694,531, filed on Apr. 23, 2015, now Pat. No. 10,036,505, and
(Continued)

(51) Int. Cl.
*F16L 57/06* (2006.01)
*B65G 53/52* (2006.01)
(Continued)

(52) U.S. Cl.
CPC ............. *F16L 43/00* (2013.01); *F16L 41/021* (2013.01); *F16L 41/023* (2013.01); *F16L 57/06* (2013.01);
(Continued)

(58) Field of Classification Search
CPC ........ F16L 43/00; F16L 41/021; F16L 41/023; F16L 57/06; F16L 43/007; F16L 58/18;
(Continued)

(56) References Cited

U.S. PATENT DOCUMENTS 2,905,206 A    9/1959   Creighton, Jr.
2,924,546 A    2/1960   Shaw
(Continued)

FOREIGN PATENT DOCUMENTS

DE        636383      10/1936
DE        827624       1/1952
WO     1982004302     12/1982

OTHER PUBLICATIONS

"Combined Search and Examination Report under Sections 17 and 18(3)", UK Appln. No. GB1507017.0, dated Sep. 1, 2015.
(Continued)

*Primary Examiner* — Sarang Afzali
*Assistant Examiner* — Darrell C Ford
(74) *Attorney, Agent, or Firm* — Law Office of Mark Brown, LLC; Chrstopher M. DeBacker

(57) ABSTRACT

A ceramic-backed elbow featuring an extended chamber which alters the flow of fluent through the elbow section. This chamber is lined with a ceramic material and ceramic tiles. The remainder of the elbow is similarly coated with a ceramic mixture. The elbow could be placed into a coating pan upon the tiles being adhered to the elbow, and the entire elbow may be coated with an abrasive-resistant coating. A thin metal skin may then be applied over the entire surface of the coating.

5 Claims, 17 Drawing Sheets

Related U.S. Application Data a continuation-in-part of application No. 14/694,168, filed on Apr. 23, 2015, now abandoned.

(60) Provisional application No. 61/983,858, filed on Apr. 24, 2014, provisional application No. 61/983,862, filed on Apr. 24, 2014.

(51) Int. Cl.
*F16L 58/18* (2006.01)
*F16L 58/14* (2006.01)
*F16L 43/00* (2006.01)
*F16L 41/02* (2006.01)

(52) U.S. Cl.
CPC .......... *B65G 53/523* (2013.01); *F16L 43/007* (2013.01); *F16L 58/14* (2013.01); *F16L 58/18* (2013.01)

(58) Field of Classification Search
CPC .... F16L 58/14; B65G 53/523; Y10T 29/4998; Y10T 29/49982; Y10T 29/49986; Y10T 29/49428; Y10T 29/49444; Y10T 29/49718; Y10T 29/49732; Y10T 29/49735; Y10T 29/49737; Y10T 29/49742; Y10T 29/49748
USPC ..... 29/527.1, 527.2, 527.4, 890.14, 890.149, 29/402.01, 402.09, 402.12, 402.13, 29/402.16, 402.19
See application file for complete search history.

(56) References Cited

U.S. PATENT DOCUMENTS

| | | | |
|---|---|---|---|
| 3,250,538 A | | 5/1966 | Albon |
| 3,258,512 A | * | 6/1966 | Flower .................... F16L 58/18 264/46.9 |
| 3,359,351 A | | 12/1967 | Bender |
| 3,551,006 A | | 12/1970 | James |
| 3,833,267 A | * | 9/1974 | McCumber .......... B65G 53/523 406/193 |
| 4,130,300 A | * | 12/1978 | Sheridan .................. F16L 57/06 285/16 |
| 4,205,034 A | * | 5/1980 | Newberry ............. B29C 53/083 264/103 |
| 4,251,170 A | * | 2/1981 | Sheridan .................. F16L 57/06 138/103 |
| 4,387,914 A | * | 6/1983 | Paulson ............... B65G 53/523 285/119 |
| 4,442,053 A | | 4/1984 | Pickering et al. |
| 4,554,721 A | * | 11/1985 | Carty ................... B65G 53/523 138/147 |
| 4,865,353 A | * | 9/1989 | Osborne ................. F16L 43/00 285/16 |
| 5,003,687 A | * | 4/1991 | Lapp ........................ H01P 1/02 156/173 |
| 5,060,984 A | | 10/1991 | Hess |
| 5,131,688 A | | 7/1992 | Tricini |
| 6,467,812 B1 | * | 10/2002 | Klemm .................. E04G 21/04 285/55 |
| 6,531,019 B2 | | 3/2003 | Usui |
| 7,303,359 B1 | * | 12/2007 | Damman ................ F16L 57/06 138/97 |
| 7,520,535 B2 | | 4/2009 | Gronquist |
| 2003/0207103 A1 | | 11/2003 | Zvosec |
| 2008/0169642 A1 | * | 7/2008 | Yang ...................... F16L 57/06 285/16 |
| 2009/0250135 A1 | * | 10/2009 | Friedrich .................. F16L 9/02 138/143 |
| 2011/0089679 A1 | * | 4/2011 | Meredith ................ F16L 17/10 285/15 |
| 2012/0240383 A1 | * | 9/2012 | Kaneko ..................... B28B 7/38 29/527.1 |
| 2015/0306624 A1 | * | 10/2015 | Allison .................. F16L 58/18 427/383.1 |
| 2017/0314724 A1 | * | 11/2017 | Zhou ........................ F16L 9/19 |

OTHER PUBLICATIONS

"Combined Search and Examination Report under Sections 17 and 18(3)", UK Appln. No. GB1507015.4, dated Sep. 29, 2015.

* cited by examiner

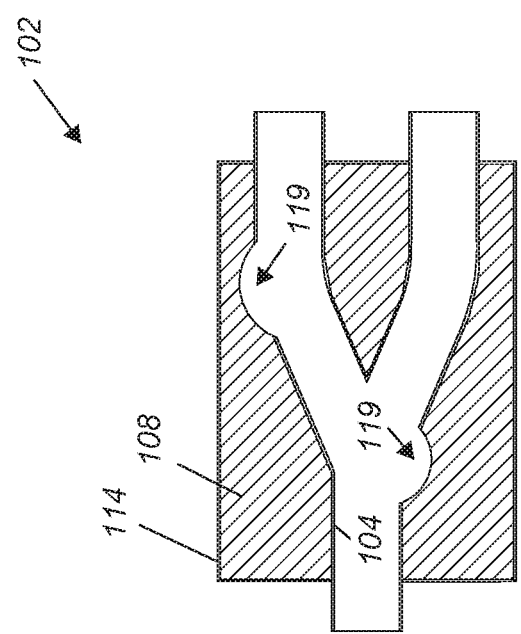

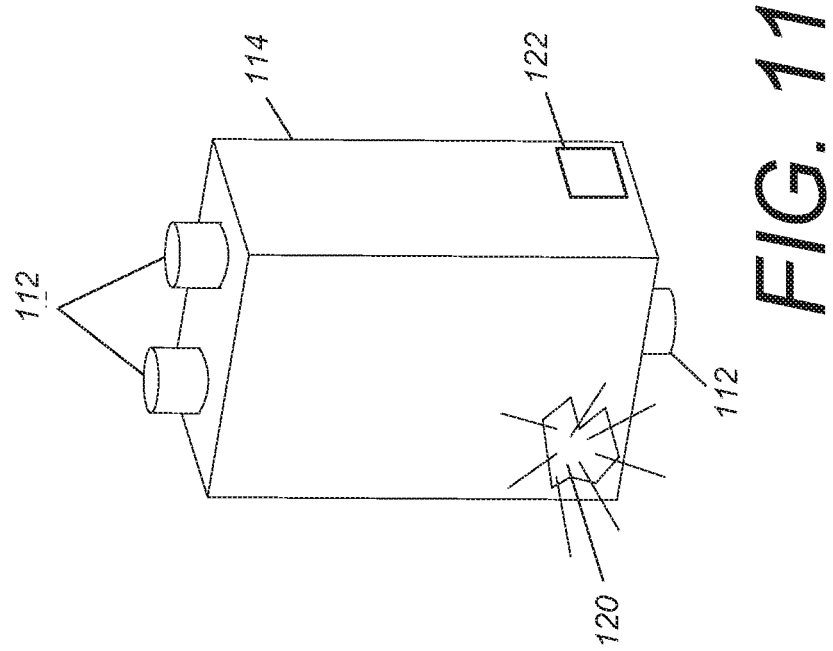

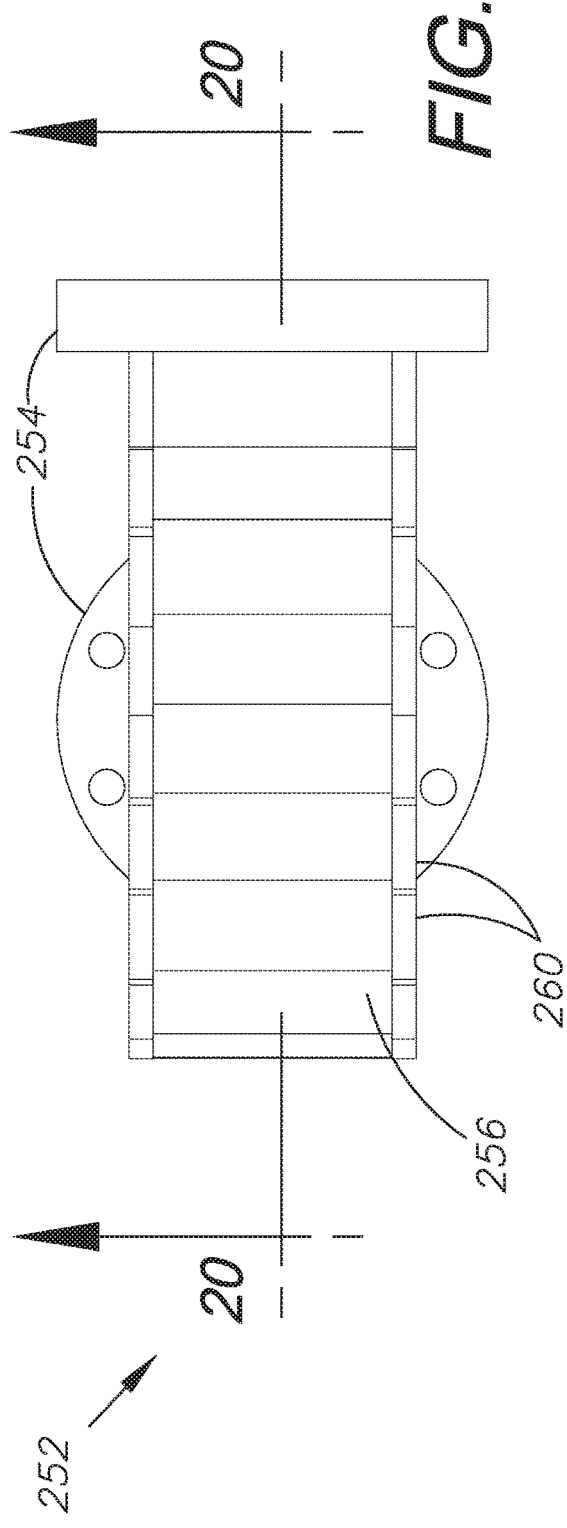
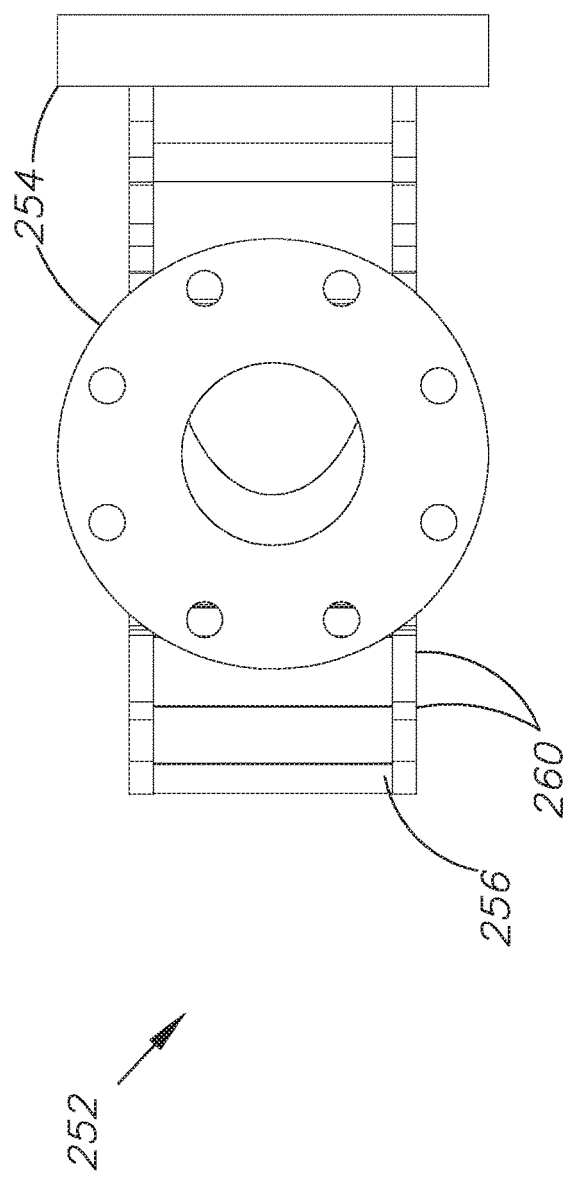

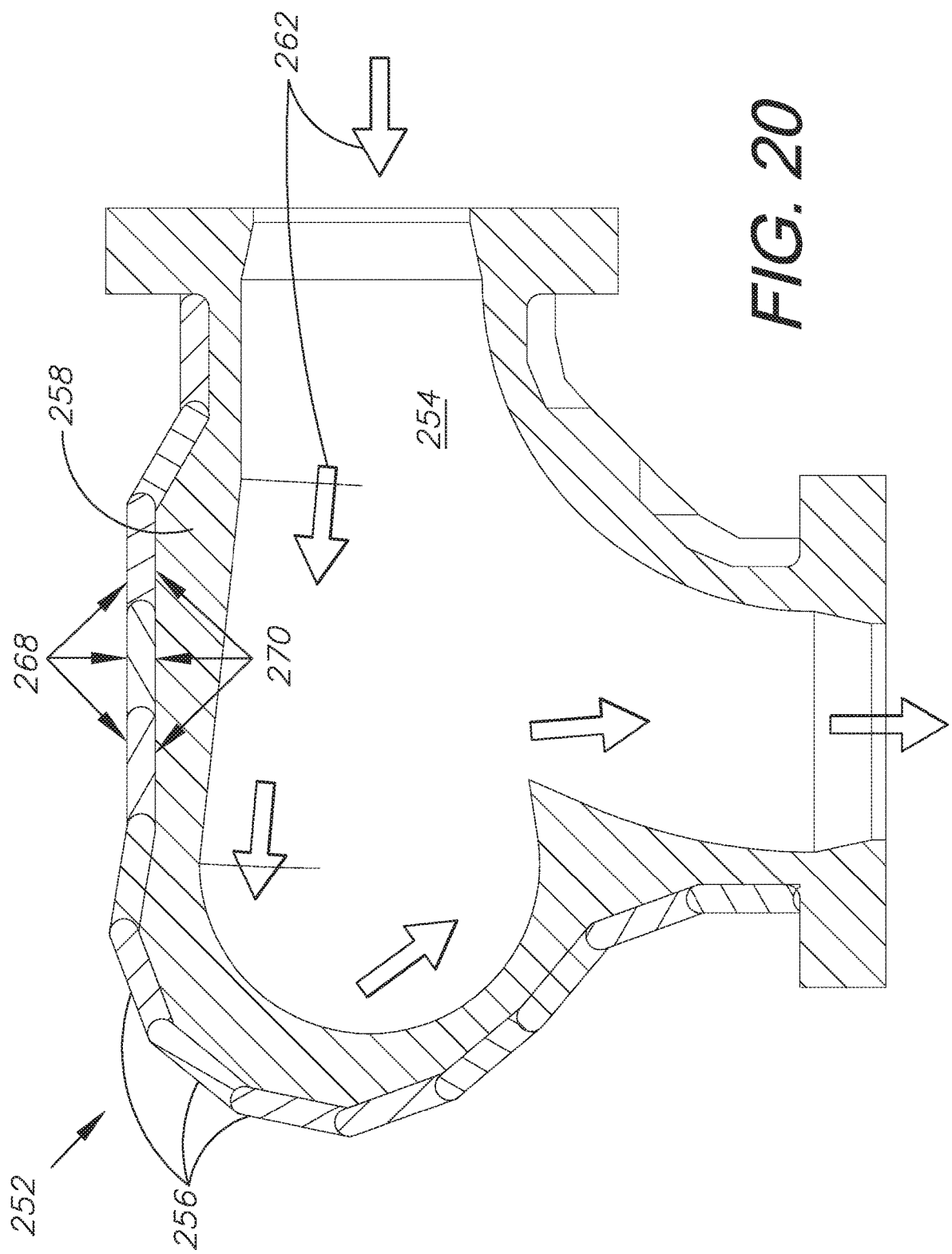

CERAMIC-BACKED ELBOW AND COATING SYSTEM AND METHOD

CROSS-REFERENCE TO RELATED APPLICATION

This application is a continuation in part of and claims priority in U.S. patent application Ser. No. 14/694,531, Filed Apr. 23, 2015 which claims priority in U.S. Provisional Patent Application No. 61/983,858, filed Apr. 24, 2014, and is a continuation-in-part of U.S. application Ser. No. 14/694,168, Filed Apr. 23, 2015 which claims priority in U.S. Provisional Patent Application No. 61/983,862, filed Apr. 24, 2014, all of which are incorporated herein by reference.

BACKGROUND OF THE INVENTION

1. Field of the Invention

The present invention relates generally to a ceramic-backed elbow, and more specifically to wear-resistant pipe elbow featuring a ceramic extension for providing wear-resistance while effecting short radius turns in fluent transport systems.

2. Description of the Related Art

Existing wear-resistant elbows are made of typical materials which eventually wear over time. Existing "smart elbows," such as those taught by U.S. Pat. No. 4,387,914 to Paulson et al. and assigned to HammerTek Corporation of Landisville, Pa. suffer from this issue. What is needed is a short radius elbow with the benefits of ceramic tile and ceramic mixture components to increase the durability and wear-resistance of the pipe elbow.

Existing abrasion-resistant and wear-resistant pipes serve for a time, but once worn they must be replaced. It is difficult and often inefficient to patch existing pipe sections, including elbows, wyes, tees, reducers, and other sections highly susceptible to wear, especially when carrying abrasive fluent. What is needed is a method of transforming a simple pipe section into a highly-adaptable and wear-resistant section which can be easily patched before being replaced.

Heretofore there has not been available a ceramic-backed piped section and method of coating pipe sections with the advantages and features of the present invention.

BRIEF SUMMARY OF THE INVENTION

The present invention generally provides a ceramic-backed elbow featuring an extended chamber which alters the flow of fluent through the elbow section. This chamber is lined with a ceramic material and ceramic tiles to increase the durability and wear-resistance of the elbow. The remainder of the elbow is similarly coated with a ceramic mixture for similar wear-resistance.

Alternatively, the entire structure may be covered with ceramic tiles.

Alternatively, the tiles can be applied prior to a coating being placed over the entirety of the elbow, except for the open connecting ends of the elbow. This can be done by placing the elbow into a coating pan and covering the elbow with the abrasive-resistant material.

BRIEF DESCRIPTION OF THE DRAWINGS

The drawings constitute a part of this specification and include exemplary embodiments of the present invention illustrating various objects and features thereof.

FIG. 10 is a sectional view of a preferred embodiment of the present invention showing wear in a pipe section.

FIG. 11 is an isometric view of a preferred embodiment of the present invention showing a leak through the coating.

FIG. 16 is a top plan view thereof.

FIG. 17 is a bottom plan view thereof.

FIG. 20 is a side sectional view taken about the line of FIG. 16.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Ceramic-Backed Elbow 2

A preferred embodiment features a low radius elbow 4 including an extension with a cavity 5, sometimes referred to as a deflection zone, similar to the Smart Elbow® produced by HammerTek Corporation of Landisville, Pa. The extension is surrounded by several ceramic tiles 6 which increase the life of the elbow by providing wear-resistance. The remainder of the elbow may be coated with a ceramic mixture 8 that similarly increases the life of the elbow. Due to the majority of wear occurring within the cavity 5, the ceramic tiles 6 are only necessarily placed in proximity to the cavity. However, they could be placed throughout the elbow if desired.

As material flows through the elbow, the elbow tends to wear out, especially in the deflection zone cavity 5. When using highly abrasive material, like powders, the wearing out of the elbow 4 occurs even faster. The ceramic tiles 6 are highly resistant to abrasive wear and extend the life of the elbow for much longer than a non-protected elbow.

III. Alternative Embodiment Coated Elbow 22

Figure 2:
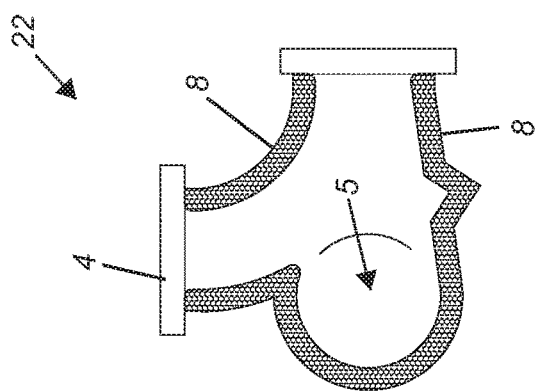
FIG. 2 is a side sectional view of an alternative embodiment of the present invention.

FIG. 2 shows an elbow 4 with a ceramic coating 8, or other abrasive resistant coating such as a ceramic mixture, a cement mixture, or a urethane mixture, is applied to all surfaces of the elbow 4, except for the open ends of the elbow where the elbow connects to other pipe sections. This ceramic coating is applied similarly to the related patent application Ser. No. 14/694,168, assigned to Progressive Products, Inc. of Pittsburg, Kans., which is incorporated in its entirety herein by reference. The method of coating a pipe section includes placing the elbow into a coating pan while leaving the ends of the elbow exposed, coating the elbow with the abrasive-resistant material, and allowing the material to harden. A thin metal skin 34 can be placed over the abrasive-resistant material to provide additional abrasive resistance and to allow for easy patching at 38 to further extend the life of the elbow, as shown in FIG. 3A, resistance and to allow for easy patching to further extend the life of the elbow.

IV. Alternative Embodiment Coated Ceramic-Backed Elbow 32

Figure 3:
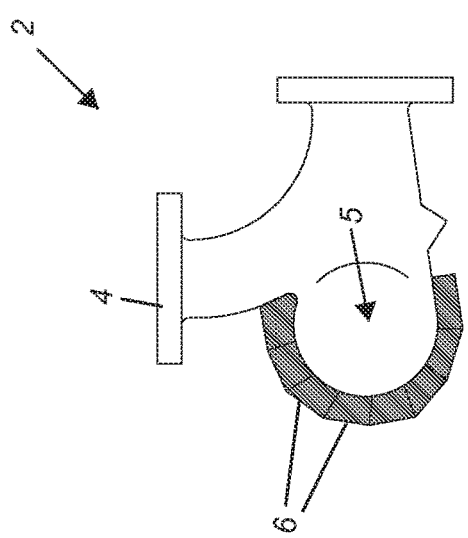
FIG. 3 is a side sectional view of yet another alternative embodiment of the present invention.
Figure 3A:
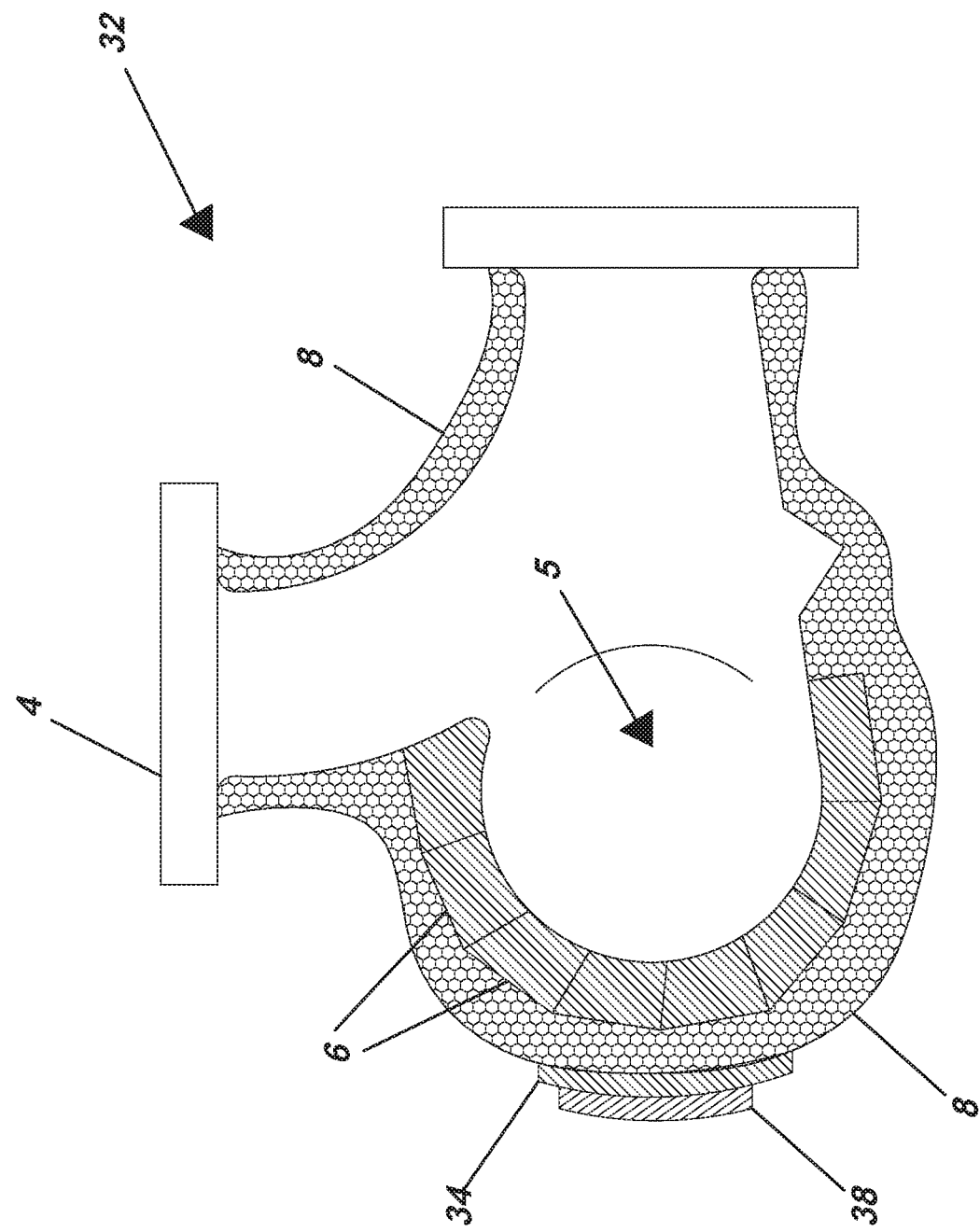
FIG. 3A is a side sectional view of yet another alternative embodiment of the present invention.

FIG. 3 shows an elbow 4 with a ceramic coating 8 and several ceramic tiles, which combines the two embodiments disclosed above. This provides the maximum level of wear-resistant protection to the elbow and extends the life of the elbow for several times the length of an elbow alone.

Any other pipe section, including straight pipe sections, could be fitted with ceramic tiles 6 and/or abrasive-resistant coatings 8; however, the elbow 4 with a deflection zone cavity 5 presents the best example of a pipe section requiring high levels of abrasion resistance to prevent constant replacement of pipe section parts, which can cause a shut-down in production.

V. Alternative Embodiment Coated Pipe Section 102

A pipe section 104, such as a wye, a tee, an elbow, or another section susceptible to wear, is placed in a coating pan 106 and immersed in an abrasion-resistant coating element 108, such as a ceramic mixture, a cement mixture, or a urethane mixture. The ends of the pipe section should extend out from the bin such that the internal portions of the pipe are left uncoated.

Once the abrasion-resistant material sets, the entire coated pipe section is removed from the bin and a sheet-metal skin is applied to the entire layer of abrasion-resistant material. This sheet metal layer is patchable, such that when the abrasive fluent eventually penetrates the pipe, the abrasion-resistant material, and the skin, the skin can easily be patched while a replacement section is fabricated.

Figure 4:
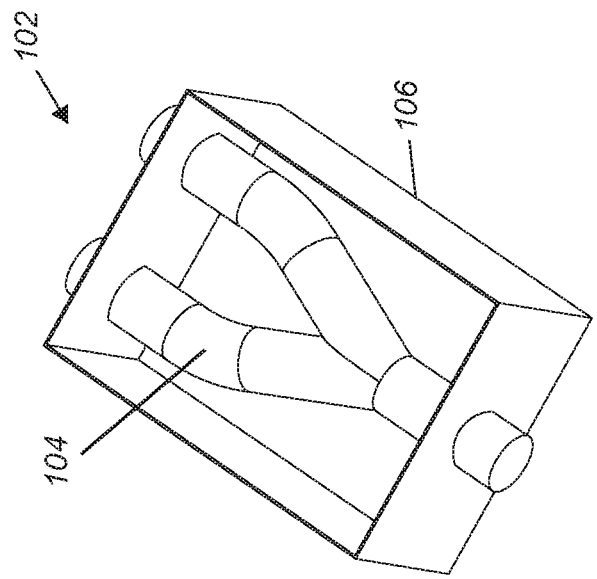
FIG. 4 is an isometric view of a preferred embodiment of the present invention in a setup stage.
Figure 5:
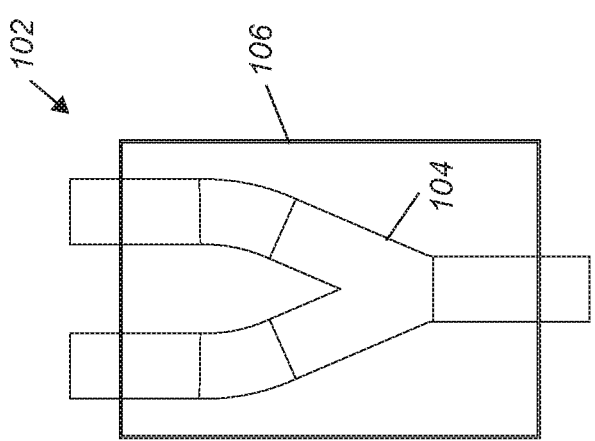
FIG. 5 is a top plan view thereof.

Referring to the figures in more detail, FIGS. 4 and 5 show a pipe section coating system 102 which primarily includes a coating pan 106 with a pipe section 104 inserted into the pan. Pipe ends 112 extend out beyond the coating pan 106 which allows the pipe section to be joined up to other sections of pipe (not shown).

Figure 6:
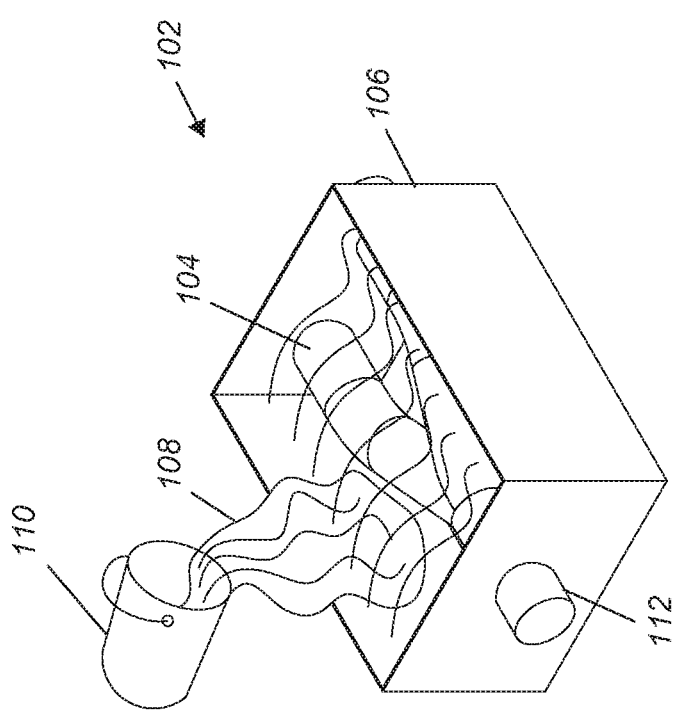
FIG. 6 is an isometric view showing a preferred embodiment of the present invention in a manufacturing stage.

FIG. 6 shows the pipe section 104 being covered by the coating element 108, which fills the coating pan 106, completely covering the pipe section. Here the coating element 108 is shown being applied through a bucket 110, but any method of filling the coating pan 106 would suffice.

Figure 7:
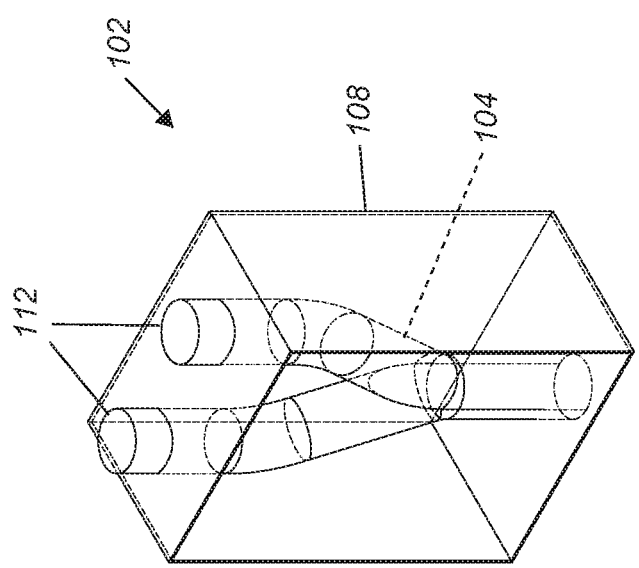
FIG. 7 is an isometric view showing a preferred embodiment of the present invention in a coated stage.
Figure 8:
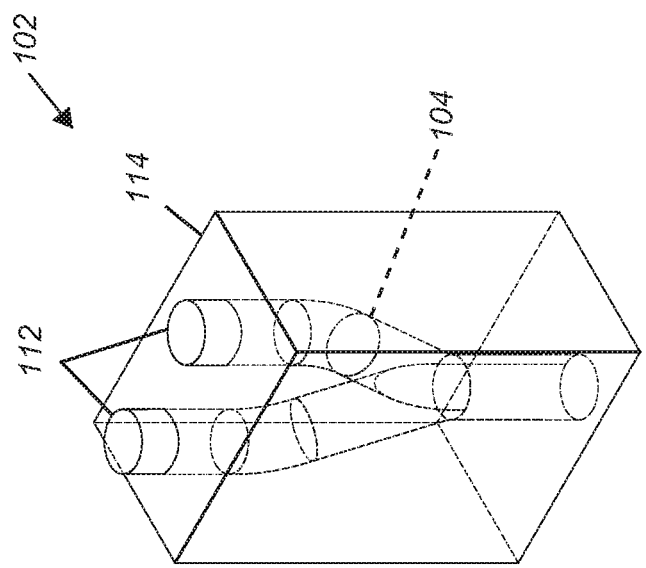
FIG. 8 is an isometric view showing a preferred embodiment of the present invention in a covered metal skin stage.

FIG. 7 shows the pipe section 104 completely encased in a hardened coating 108. The coating here is shown as removed from the pan 106. FIG. 8 shows the entirety of the coating 108 being covered in a thin sheet-metal skin 14 which provides additional resistance and the capability of patching worn holes in the coating.

Figure 9:
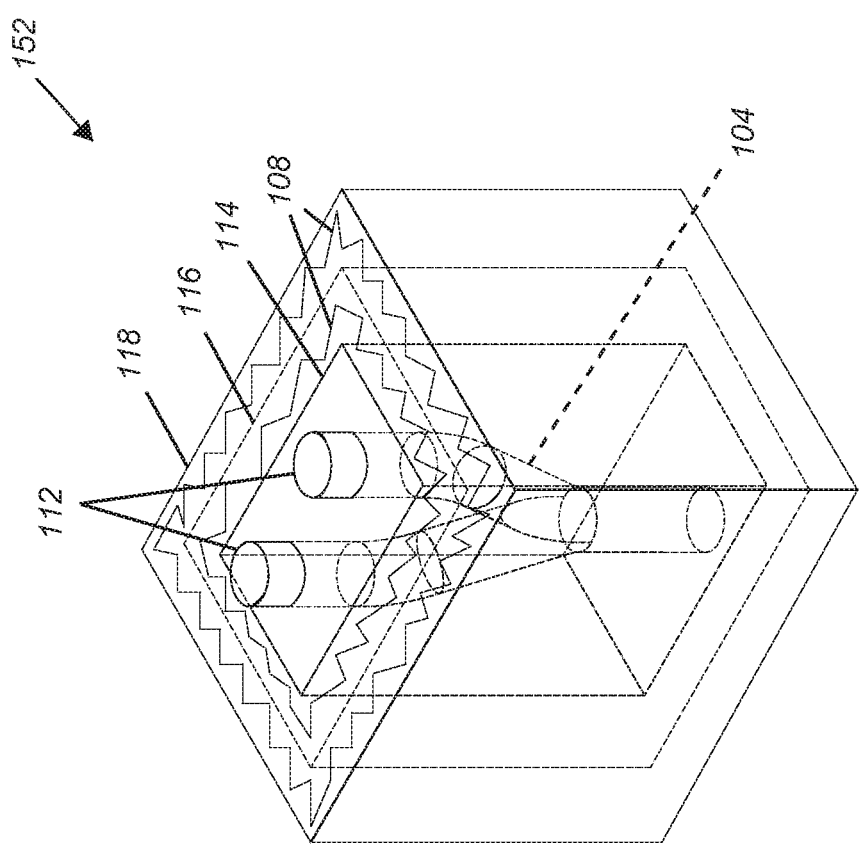
FIG. 9 is an isometric view showing an alternative embodiment of the present invention featuring multiple layers of coating and metal skins.

FIG. 9 shows an alternative pipe coating system 152 wherein the original coating 108 and metal skin 114 are covered by additional layers of coating 108 and additional layers of skin 116, 118, as shown. Any number of additional layers may be used.

FIG. 10 demonstrates how the pipe sections 104 and coating 108 wear out when abrasive or corrosive material is fed through the pipe section. The wear areas 119 slowly erode outwards towards the metal skin 114 of the coating system 2.

FIG. 11 demonstrates when a puncture 120 occurs, or where the coating 108 and metal skin 114 are so worn that the material breaks through and leaks out of the pipe section 104. A patch 122 can be applied to such worn areas, which allows the pipe section to continue functioning while a replacement can be manufactured. Such patching wouldn't be possible without the metal coating.

Figure 12C:
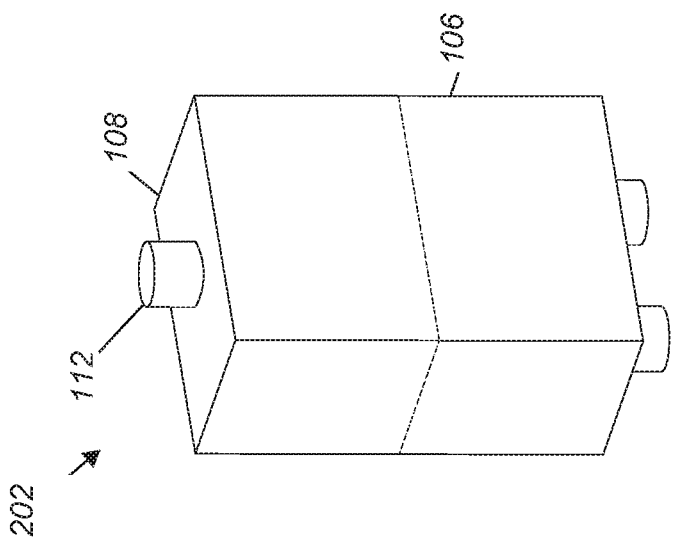
FIG. 12C shows a first step in an alternative embodiment of the present invention coating and manufacturing process.
Figure 12B:
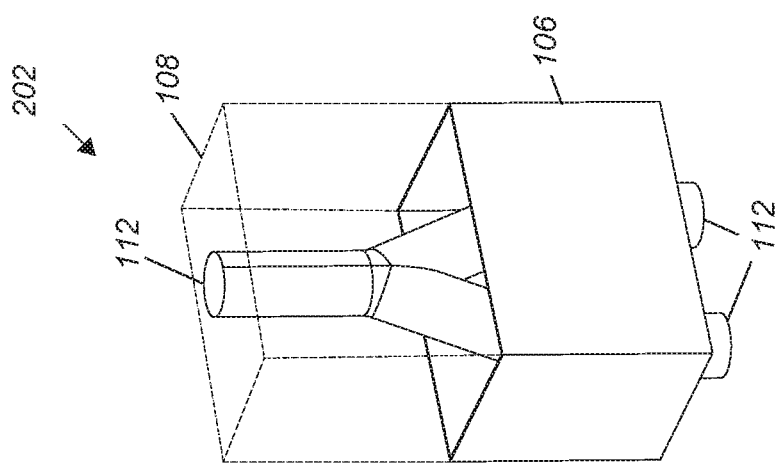
FIG. 12B shows a first step in an alternative embodiment of the present invention coating and manufacturing process.
Figure 12A:
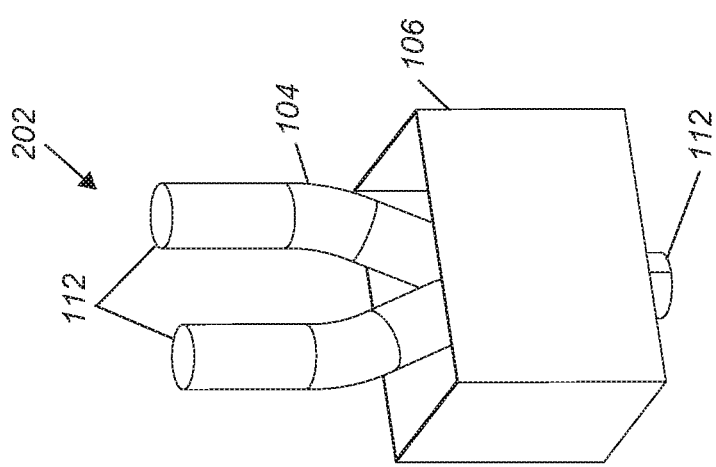
FIG. 12A shows a first step in an alternative embodiment of the present invention coating and manufacturing process.

FIGS. 12A-12C demonstrate an alternative coating method 202 which includes coating multiple portions of a single pipe section 104 through multiple applications of the coating 108. 12A shows a portion of the pipe section 104 being placed in the coating pan 106, which is then filled and allowed to harden as mentioned above. Then the pipe section 104 is flipped, the remaining pipe section being placed into a coating pan 106 and coated. The result may leave a seam between the two coating portions, but this allows for smaller pans used or larger pipe sections to be coated. This is also important when dealing with awkward or difficultly shaped pieces of pipe sections which may not fit into a single pan 106.

Figure 13C:
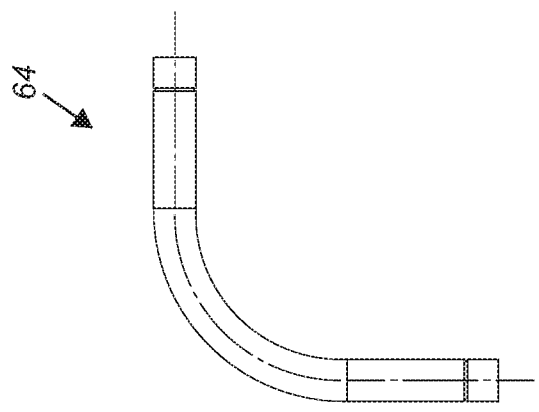
FIG. 13C shows an example type of pipe section, featuring an elbow.
Figure 13B:
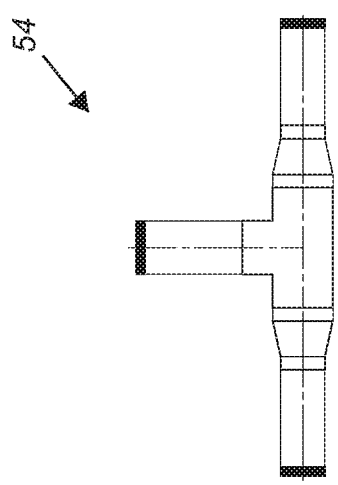
FIG. 13B shows an example type of pipe section, featuring a T-shaped pipe section.
Figure 13D:
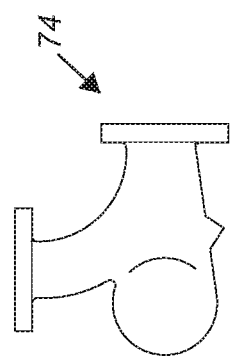
FIG. 13D shows another example type of pipe section, featuring an elbow with a deflection zone.
Figure 13A:
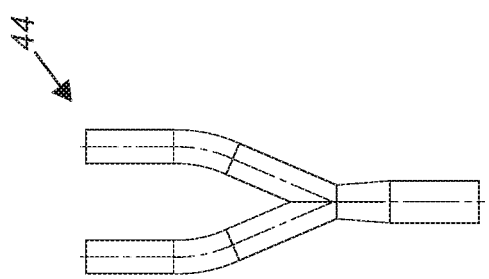
FIG. 13A shows an example type of pipe section, featuring a Y-shaped pipe section.
Figure 14:
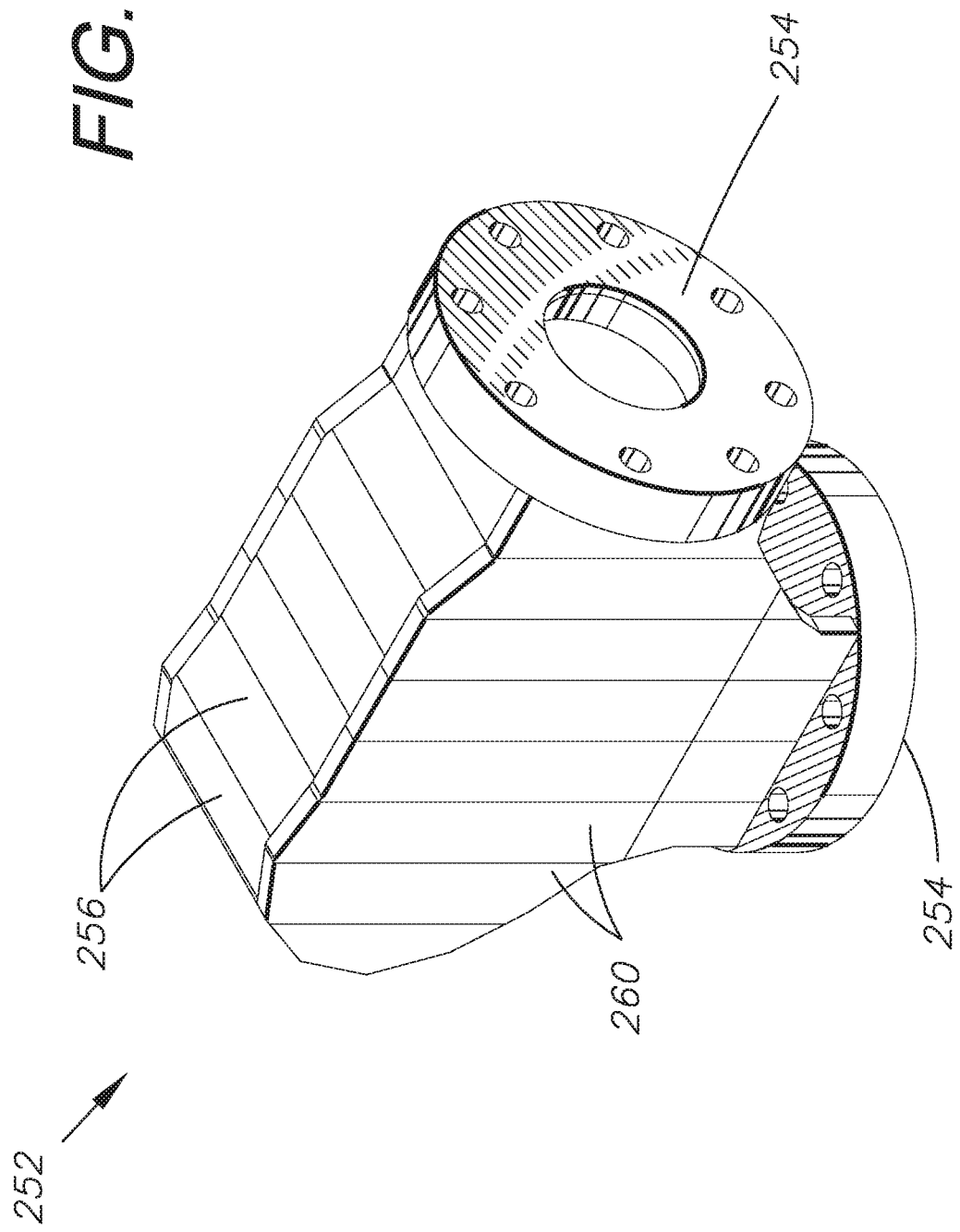
FIG. 14 is a three-dimensional isometric view of an alternative embodiment of the present invention.
Figure 15:
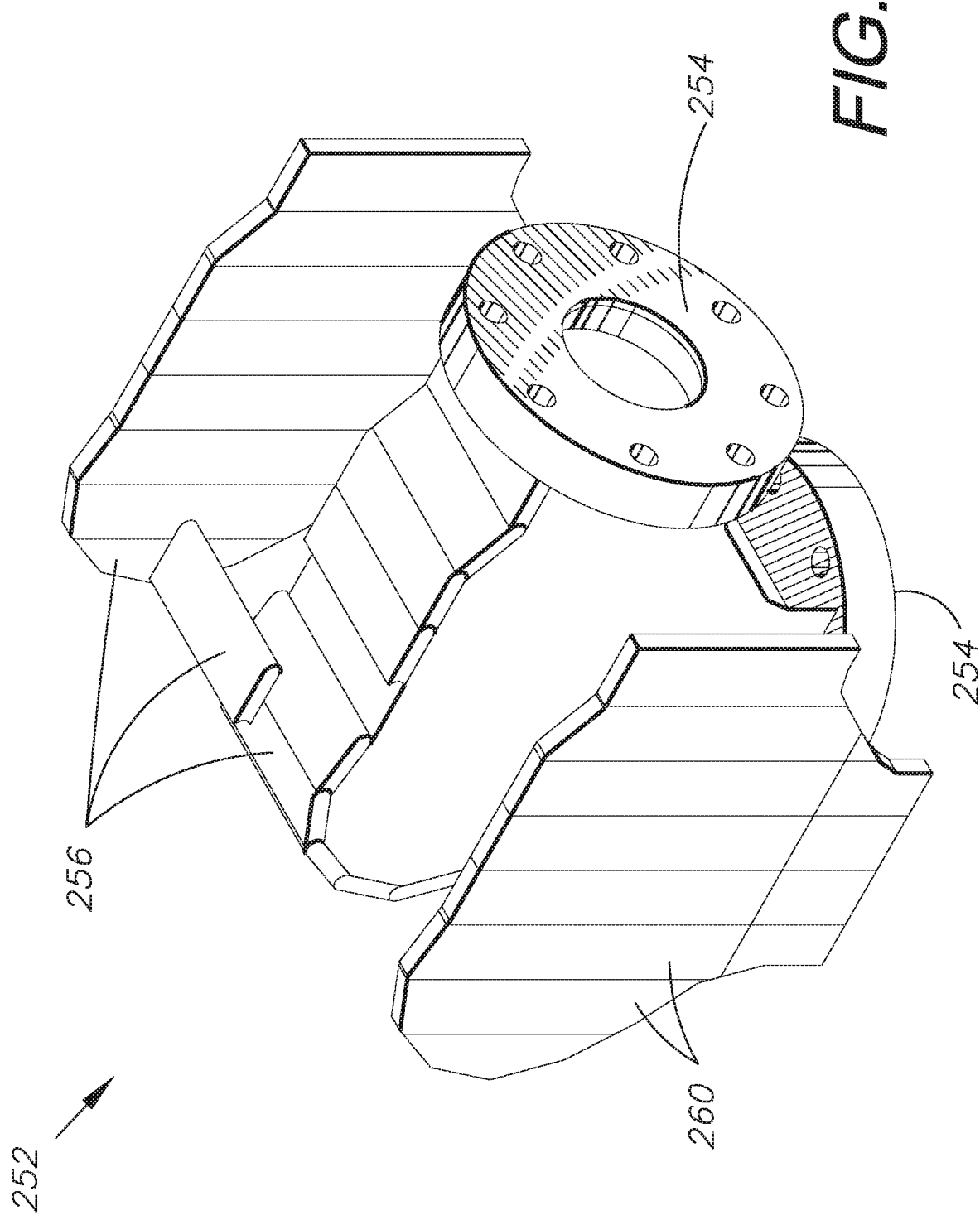
FIG. 15 is a partially exploded three-dimensional isometric view thereof.
Figure 19:
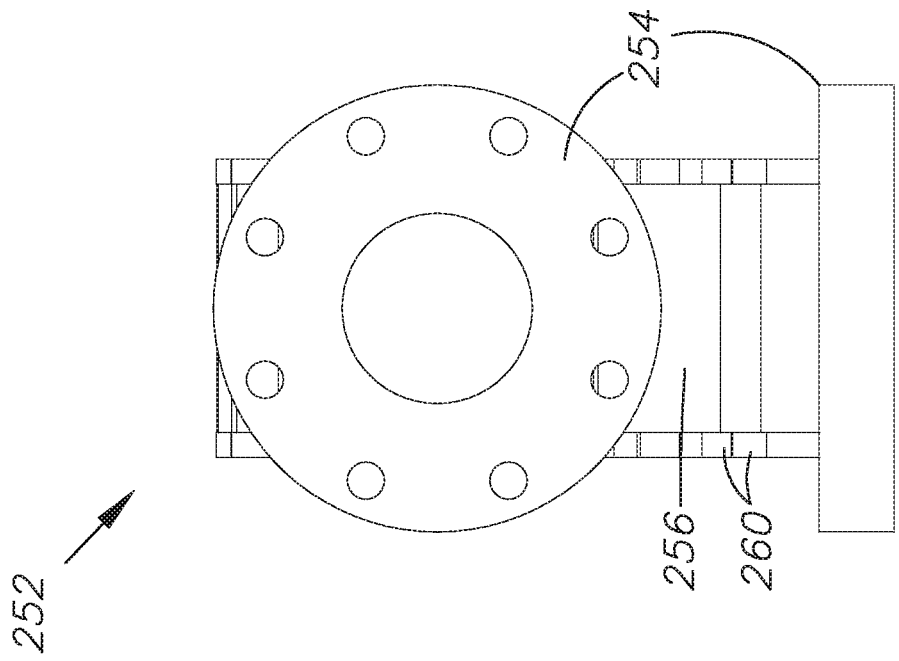
FIG. 19 is a front elevational view thereof.
Figure 18:
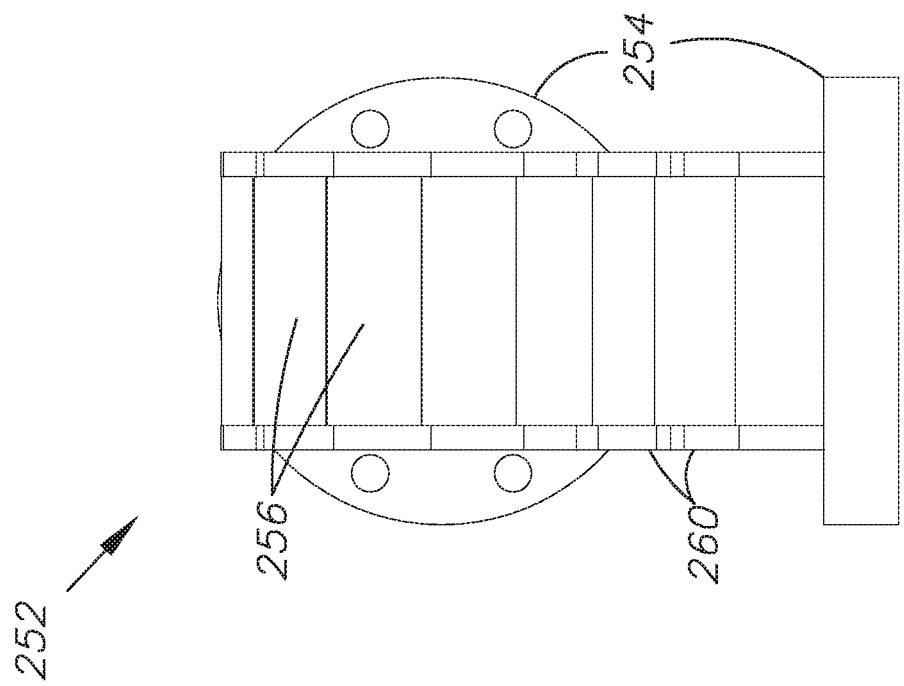
FIG. 18 is a rear elevational view thereof.
Figure 21:
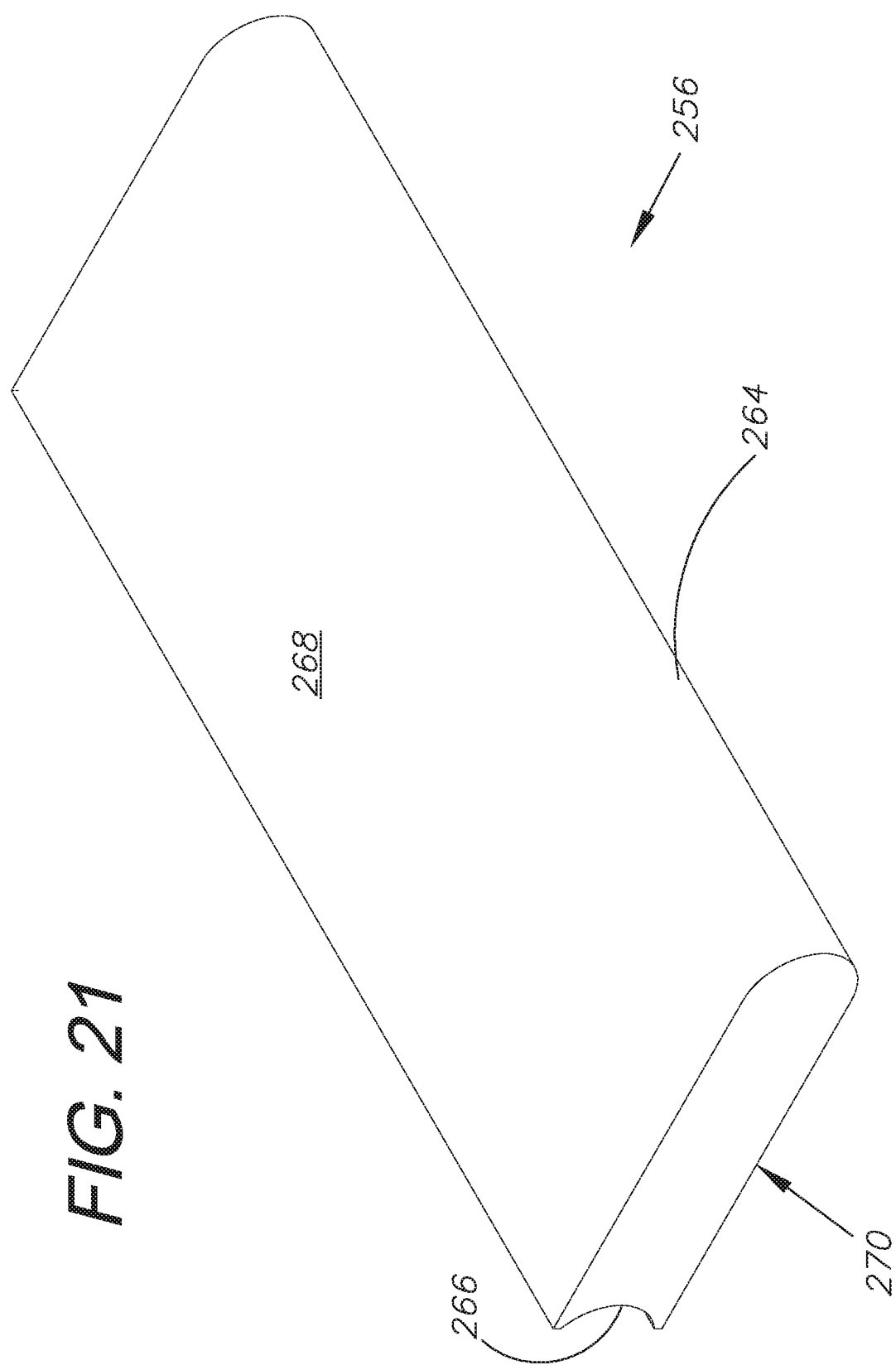
FIG. 21 is a three-dimensional isometric view of a tile element of the alternative embodiment thereof.

FIGS. 13A-13D show four common examples of pipe sections that could be coated using the method of coating of the present invention. FIG. 13A shows a "Y" or wye shaped pipe section 44, FIG. 13B shows a "T" or tee shaped pipe section 54, and FIG. 13C shows an elbow section 64. FIG. 13D shows an elbow with a deflection zone 74, such as the Smart Elbow® produced by HammerTek Corporation of Landisville, Pa. Sections with turns, bends, splits, or other non-straight segments are more prone to suffer from wear when abrasive material flows through the pipe due to the frictional effect of material physically contacting the walls of the pipe sections in order to turn directions. Thus, these pipe sections are prime examples of pipe sections which may benefit from the coating process, however they do not represent all of the possible examples of pipe sections which may be coated in such a manner.

This process can be used with any existing pipe section, removing the need to order and manufacture specific abrasion-resistant pipe sections every time they are needed.

VI. Alternative Embodiment Reinforced Elbow System 252

Figure 1:
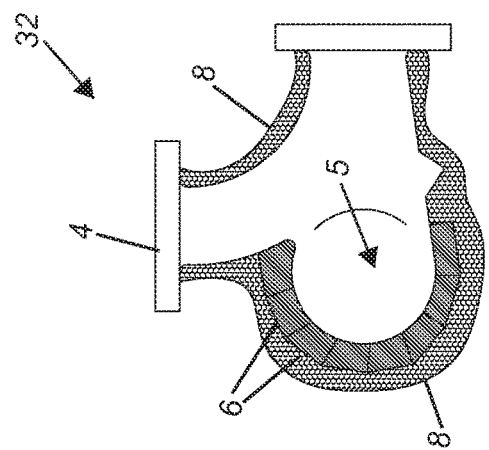
FIG. 1 is a side sectional view of an embodiment of the present invention.

FIGS. 14-21 show an alternative embodiment reinforced elbow system 252 where flat tiles 256, 260 are placed on an elbow pipe section 254, similar to the elbow 74 as shown in FIG. 13D. This is an improvement upon the pipe coating system as shown in FIGS. 1-3 as the flat side tiles 260 and top tiles 256 are flat. Each top tile 256 has a top surface 268, a bottom surface 270, a convex front edge 264, and a convex rear edge 266. The concave/convex rear/front edges, shown in more detail in FIG. 21, allow the tiles 256 to interlock, allowing them to be arranged around a pipe section having complicated curves such as the elbow 254 shown, but which could also be used for other pipe sections. Each tile is allowed to remain uniform, making it simple to construct multiple tiles which can be used to cover the pipe elbow section, rather than requiring several tile shapes to be fitted together as shown in FIGS. 1-3. The tiles would be cemented to the pipe section and may also be sealed together using a similar coating as discussed previously.

FIG. 20 shows how the flow 262 through the elbow 254 occurs during use of the pipe elbow section when carrying abrasive fluent material. The tiles 256 provide secondary protection and ensure longer life of the elbow after the abrasive fluent material wears through the elbow wall 258. As with the previous embodiments, these tiles could also be covered with a coating using a similar coating pan system, and a thin metal skin may further be applied over the top of that coating.

The side tiles 260 may also include similar concave rear edges and convex front edges to allow them to be joined together in the same manner as the top tiles 256.

It is to be understood that while certain embodiments and/or aspects of the invention have been shown and described, the invention is not limited thereto and encompasses various other embodiments and aspects.

Having thus described the disclosed subject matter, what is claimed as new and desired to be secured by Letters Patent is:

1. A method of constructing, installing, and maintaining an-abrasion-resistant pipe segment for a fluent pipe system, the method comprising the steps:
   providing a pipe segment comprising a first open end and a second open end;
   placing said pipe segment into a coating pan, wherein said first and second ends extend beyond said coating pan;
   pouring a coating material over said pipe segment and filling said coating pan via an open side of said coating pan;
   drying said coating material such that said coating material hardens into a hardened coating material in the form of said coating pan;
   installing said pipe segment including said hardened coating material and said coating pan into a fluent flow pipe system comprising at least a first pipe section and a second pipe section;
   transferring fluent material through said first pipe section, said pipe segment, and said second pipe section, wherein said hardened coating material is configured to prevent material traveling through said pipe segment from forming a leak within said pipe segment;
   wherein said coating pan forms a metal skin over the exterior of all sides of said hardened coating material except for said open side; and
   placing an additional metal skin cover over the exterior of said coating material about said open side of said coating pan.

2. The method of claim 1, wherein:
   said pipe segment comprising a bend including a continuous annular channel, an interior face, an exterior face, an inner arc, and an outer arc; and
   a chamber formed on the outer arc of said bend opposite said first open end, said chamber opening into said channel on one side tangential to a wall of said channel with the other side of said chamber merging with said outer arc at a point outwardly offset parallel to the central axis of said first open end by one quarter of the diameter of the channel.

3. The method of claim 1, wherein said coating material comprises an ingredient selected from the list comprising: ceramic; cement; and urethane.

4. The method of claim 1, further comprising the steps:
   patching a hole formed by said fluent material through said pipe section, said coating material, and said metal skin with a metal patch applied to an exterior face of said metal skin.

5. The method of claim 1, further comprising the steps:
   placing said pipe segment and said coating material into a second coating pan;
   pouring a second coating material of said coating material and said pipe section; and
   drying said second coating material prior to installing said pipe section.

* * * * *